United States Patent
Ikeda et al.

(10) Patent No.: US 9,836,615 B2
(45) Date of Patent: Dec. 5, 2017

(54) MUSIC-CONTENT USING APPARATUS CAPABLE OF MANAGING COPYING OF MUSIC CONTENT, AND PROGRAM THEREFOR

(71) Applicant: Yamaha Corporation, Hamamatsu-Shi, Shizuoka-Ken (JP)

(72) Inventors: Takashi Ikeda, Hamamatsu (JP); Tetsuo Okamoto, Hamamatsu (JP); Tsutomu Yanase, Hamamatsu (JP)

(73) Assignee: Yamaha Corporation, Hamamatsu-Shi (JP)

(*) Notice: Subject to any disclaimer, the term of this patent is extended or adjusted under 35 U.S.C. 154(b) by 915 days.

(21) Appl. No.: 13/827,721

(22) Filed: Mar. 14, 2013

(65) Prior Publication Data

US 2013/0219521 A1    Aug. 22, 2013

Related U.S. Application Data

(62) Division of application No. 10/829,310, filed on Apr. 20, 2004, now abandoned.

(30) Foreign Application Priority Data

Apr. 21, 2003    (JP) .................................. 2003-115666

(51) Int. Cl.
  *G06F 21/62*    (2013.01)
  *G06F 21/10*    (2013.01)
  (Continued)

(52) U.S. Cl.
  CPC .......... *G06F 21/6209* (2013.01); *G06F 21/10* (2013.01); *G06Q 50/188* (2013.01);
  (Continued)

(58) Field of Classification Search
  CPC ................. G06F 21/10; G06F 21/6209; G06F 2221/0711; G06C 50/188; G10H 1/0058; G10H 2240/026; G10H 2240/091
  See application file for complete search history.

(56) References Cited

U.S. PATENT DOCUMENTS 5,950,198 A * 9/1999 Falls .......................... G06F 8/71
6,141,753 A * 10/2000 Zhao ..................... G06T 1/0021
                                                                    380/277
(Continued)

FOREIGN PATENT DOCUMENTS

JP    05-027766    2/1993
JP     8227434     9/1996
(Continued)

OTHER PUBLICATIONS

Final Office Action dated Oct. 25, 2007, for U.S. Appl. No. 10/829,310, filed Apr. 20, 2004, 11 pages.
(Continued)

*Primary Examiner* — Mamon Obeid
(74) *Attorney, Agent, or Firm* — Morrison & Foerster LLP (57) ABSTRACT

When new music content is generated on the basis of replication of original music content, additional information including information indicating that the generated new music content is based on replication and replication source information identifying a replicated-from source of the replicated content is generated and added to the new music content based on the replication. When the new (i.e., replicated) music content is to be used, a search is made for original music content on the basis of information identifying a replicated-from source and use of the new (replicated) music content is permitted only when the c original music content has been successfully found. Such arrangements (Continued)

reliably allow the replicated content to be used by a given person only when the person possesses the original music content.

8 Claims, 3 Drawing Sheets

(51) Int. Cl.
  *G06Q 50/18* (2012.01)
  *G10H 1/00* (2006.01)
(52) U.S. Cl.
  CPC ... *G10H 1/0058* (2013.01); *G06F 2221/0711* (2013.01); *G10H 2240/026* (2013.01); *G10H 2240/091* (2013.01)

(56) References Cited

U.S. PATENT DOCUMENTS

| | | | |
|---|---|---|---|
| 6,356,934 B1* | 3/2002 | Delph | G06F 17/30873 707/E17.111 |
| 6,370,319 B1* | 4/2002 | Matsumoto | H04N 5/765 382/100 |
| 6,421,450 B2* | 7/2002 | Nakano | G06T 1/0021 375/E7.089 |
| 6,433,946 B2* | 8/2002 | Ogino | G11B 20/00086 360/15 |
| 6,484,182 B1* | 11/2002 | Dunphy | G06F 17/30958 700/231 |
| 6,505,160 B1* | 1/2003 | Levy | G06F 17/30017 455/3.06 |
| 6,546,114 B1* | 4/2003 | Venkatesan | G06T 1/005 382/100 |
| 6,564,229 B1* | 5/2003 | Baweja | G06F 17/30067 707/741 |
| 6,606,744 B1* | 8/2003 | Mikurak | H04L 29/06 717/174 |
| 6,614,914 B1* | 9/2003 | Rhoads | G06F 17/30876 382/100 |
| 6,674,859 B1* | 1/2004 | Wittkotter | G06F 21/10 380/201 |
| 6,804,779 B1* | 10/2004 | Carroni | G06F 21/10 713/150 |
| 6,826,546 B1 | 11/2004 | Shuster | |
| 6,829,592 B1 | 12/2004 | Takenaka et al. | |
| 6,915,481 B1* | 7/2005 | Tewfik | G06Q 10/025 380/201 |
| 6,947,571 B1* | 9/2005 | Rhoads | G06Q 30/02 382/100 |
| 6,961,463 B1* | 11/2005 | Loui | G06T 7/20 382/170 |
| 6,961,858 B2* | 11/2005 | Fransdonk | G06F 21/10 380/281 |
| 7,020,635 B2* | 3/2006 | Hamilton | G06Q 20/00 705/51 |
| 7,055,034 B1* | 5/2006 | Levy | G06T 1/005 380/201 |
| 7,080,049 B2* | 7/2006 | Truitt | G06Q 20/16 380/30 |
| 7,090,128 B2* | 8/2006 | Farley | H04L 67/2823 235/384 |
| 7,107,462 B2* | 9/2006 | Fransdonk | G06Q 20/12 380/282 |
| 7,130,831 B2* | 10/2006 | Howard | G06F 21/10 705/57 |
| 7,150,045 B2* | 12/2006 | Koelle | G06F 21/552 380/201 |
| 7,249,105 B1* | 7/2007 | Peinado | G06F 21/10 705/50 |
| 7,277,544 B1* | 10/2007 | Eye | G06F 21/10 369/47.12 |
| 7,289,633 B2 | 10/2007 | Metcalf | |
| 7,512,607 B2* | 3/2009 | Nagano | G06F 21/10 |
| 7,587,502 B2* | 9/2009 | Crawford | A63F 13/12 463/42 |
| 7,627,613 B1* | 12/2009 | Dulitz | G06F 17/30864 |
| 7,689,532 B1* | 3/2010 | Levy | G06F 17/30067 707/687 |
| 7,711,586 B2* | 5/2010 | Aggarwal | G06Q 10/02 700/14 |
| 7,886,159 B2* | 2/2011 | Nonaka | G06F 21/10 713/189 |
| 8,094,949 B1* | 1/2012 | Rhoads | H04N 1/00424 382/232 |
| 8,731,291 B2* | 5/2014 | Hao | G06K 9/00664 382/168 |
| 8,868,559 B2* | 10/2014 | Dulitz | G06F 17/30864 707/736 |
| 9,430,619 B2* | 8/2016 | Wu | G06F 21/84 |
| 9,489,497 B2* | 11/2016 | MaGill | H04L 63/1425 |
| 2001/0008557 A1* | 7/2001 | Stefik | G06F 17/30017 380/202 |
| 2001/0041989 A1* | 11/2001 | Vilcauskas, Jr. | G06F 21/10 705/310 |
| 2001/0042048 A1 | 11/2001 | Boykin et al. | |
| 2002/0001100 A1* | 1/2002 | Kawanabe | G06K 15/00 358/1.15 |
| 2002/0004909 A1 | 1/2002 | Hirano et al. | |
| 2002/0052884 A1 | 5/2002 | Farber et al. | |
| 2002/0078356 A1* | 6/2002 | Ezaki | G11B 19/122 713/176 |
| 2002/0126984 A1* | 9/2002 | Hisatomi | G11B 20/00086 386/258 |
| 2002/0144153 A1 | 10/2002 | LeVine et al. | |
| 2002/0146146 A1* | 10/2002 | Miolla | G06F 21/10 382/100 |
| 2002/0178335 A1* | 11/2002 | Selkirk | G06F 3/0611 711/162 |
| 2002/0184505 A1* | 12/2002 | Mihcak | G06F 17/30026 713/180 |
| 2003/0002708 A1* | 1/2003 | Pasqua | G06T 1/0028 382/100 |
| 2003/0018777 A1 | 1/2003 | Miller et al. | |
| 2003/0053656 A1* | 3/2003 | Levy | G06Q 10/087 382/100 |
| 2003/0076955 A1* | 4/2003 | Alve | G06F 21/10 380/201 |
| 2003/0076978 A1* | 4/2003 | Eversole | G06F 17/30076 382/100 |
| 2003/0167173 A1* | 9/2003 | Levy | G06F 17/30017 704/273 |
| 2003/0196542 A1 | 10/2003 | Harrison | |
| 2003/0217272 A1* | 11/2003 | Agrawal | G06F 21/10 713/176 |
| 2004/0078338 A1 | 4/2004 | Ohta et al. | |
| 2004/0131183 A1* | 7/2004 | Sako | G11B 20/00086 380/202 |
| 2004/0167858 A1* | 8/2004 | Erickson | G06F 21/10 705/55 |
| 2004/0210539 A1 | 10/2004 | Ikeda et al. | |
| 2005/0025338 A1* | 2/2005 | Zhao | G06T 1/0028 382/100 |
| 2005/0084018 A1* | 4/2005 | LeComte | H04N 5/913 375/240.26 |
| 2005/0097059 A1* | 5/2005 | Shuster | G06Q 30/06 705/59 |
| 2005/0140679 A1* | 6/2005 | Kaneda | G06K 9/4647 345/441 |
| 2005/0185821 A1* | 8/2005 | LeComte | H04N 7/162 382/100 |
| 2006/0023913 A1* | 2/2006 | Muratani | H04N 1/00002 382/100 |
| 2006/0136340 A1 | 6/2006 | Park | |
| 2006/0155740 A1* | 7/2006 | Chen | G06F 11/3624 |
| 2006/0159109 A1* | 7/2006 | Lamkin | G06F 17/30174 370/401 |
| 2006/0164544 A1* | 7/2006 | Lecomte | H04N 7/1675 348/390.1 |

(56) References Cited

U.S. PATENT DOCUMENTS

| | | | | |
|---|---|---|---|---|
| 2006/0168450 | A1* | 7/2006 | Yagawa | G06F 21/6218 713/176 |
| 2007/0033146 | A1* | 2/2007 | Hollar | G06Q 10/10 705/57 |
| 2007/0078773 | A1* | 4/2007 | Czerniak | G06F 21/10 705/57 |
| 2007/0168415 | A1* | 7/2007 | Matahira | G10H 1/0058 709/203 |
| 2007/0250716 | A1* | 10/2007 | Brunk | G06F 21/10 713/176 |
| 2007/0280112 | A1* | 12/2007 | Zheng | H04L 12/66 370/235 |
| 2007/0294544 | A1* | 12/2007 | Ishikawa | G06F 21/10 713/193 |
| 2008/0155614 | A1* | 6/2008 | Cooper | G06F 21/10 725/91 |
| 2008/0172747 | A1* | 7/2008 | Hurtado | G06Q 20/3829 726/26 |
| 2008/0276101 | A1* | 11/2008 | Tagawa | G11B 20/00086 713/193 |
| 2009/0048997 | A1* | 2/2009 | Manickam | G06F 21/62 706/47 |
| 2009/0055402 | A1* | 2/2009 | Park | G06F 17/30029 |
| 2009/0070348 | A1* | 3/2009 | Uejo | G06F 17/30011 |
| 2009/0100041 | A1* | 4/2009 | Wilson | G06F 21/645 |
| 2009/0165137 | A1* | 6/2009 | Yoo | G06F 21/564 726/24 |
| 2009/0292994 | A1* | 11/2009 | Lwo | G06F 9/543 715/733 |
| 2010/0063984 | A1* | 3/2010 | Rosset | H04L 29/06027 707/803 |
| 2010/0076954 | A1* | 3/2010 | Dulitz | G06F 17/30864 707/709 |
| 2010/0228719 | A1* | 9/2010 | Apparao | G06F 17/30038 707/709 |
| 2010/0281545 | A1* | 11/2010 | Levy | G06F 17/30067 726/30 |
| 2011/0078585 | A1* | 3/2011 | King | G06F 17/30011 715/751 |
| 2011/0122255 | A1* | 5/2011 | Haritaoglu | G06K 9/00711 348/180 |
| 2012/0072593 | A1* | 3/2012 | Kim | G06F 21/10 709/224 |
| 2012/0136952 | A1* | 5/2012 | Mulder | G06F 17/241 709/206 |
| 2012/0143915 | A1* | 6/2012 | Gupta | G06F 17/30799 707/780 |
| 2012/0215908 | A1* | 8/2012 | Tsunoo | G06F 21/6209 709/224 |
| 2013/0219521 | A1* | 8/2013 | Ikeda | G06F 21/10 726/30 |
| 2013/0333042 | A1* | 12/2013 | Saika | G06F 11/1469 726/24 |
| 2014/0189098 | A1* | 7/2014 | MaGill | H04L 63/1425 709/224 |
| 2016/0070887 | A1* | 3/2016 | Wu | G06F 21/84 713/189 |
| 2016/0359817 | A1* | 12/2016 | Mullen | H04L 63/0428 |

FOREIGN PATENT DOCUMENTS

| | | |
|---|---|---|
| JP | 11-003349 | 1/1999 |
| JP | 2003-007034 A | 1/2003 |
| JP | 2003-016288 | 1/2003 |
| WO | WO-97/14087 | 4/1997 |
| WO | WO-01/09875 A1 | 2/2001 |
| WO | WO-01/69354 A2 | 9/2001 |

OTHER PUBLICATIONS

Final Office Action dated Jul. 22, 2008, for U.S. Appl. No. 10/829,310, filed Apr. 20, 2004, 13 pages.

Final Office Action dated Jan. 22, 2010, for U.S. Appl. No. 10/829,310, filed Apr. 20, 2004, 26 pages.

Final Office Action dated Feb. 7, 2014, for U.S. Appl. No. 10/829,310, filed Apr. 20, 2004, 16 pages.

Non-Final Office Action dated Feb. 24, 2009, for U.S. Appl. No. 10/829,310, filed Apr. 20, 2004, 12 pages.

Non-Final Office Action dated Dec. 19, 2014, for U.S. Appl. No. 10/829,310, filed Apr. 20, 2004, 17 pages.

Decision to Refuse a European Patent Application for EP Patent Application No. 04101520.7, dated Jan. 14, 2009, 24 pages.

Japanese Office Action for JP Patent Application No. 2003-115666, dated Dec. 16, 2008, with English translation.

Japanese Office Action, dated Aug. 26, 2008 regarding Japanese Patent Application No. 2003-115666.

Kobayashi, Yutaka, "Q&A answering any question," Hello! PC, p. 120-121, No. 7, vol. 6, Apr. 24, 1999, Softbank Publishing Kabushiki Kaisha, Japan.

M. Nilsson, "ID3 Tag Version 2.4.0—Native Frames" Formal Standard, Nov. 1, 2000, pp. 20-21.

Notice of Grounds for Rejection dated Mar. 8, 2011, for JP Patent Application No. P2008-136512, with English Translation, four pages.

Non-Final Office Action dated Jul. 29, 2013, for U.S. Appl. No. 10/829,310, filed Apr. 20, 2004, 16 pages.

Final Office Action dated Apr. 3, 2015, for U.S. Appl. No. 10/829,310, filed Apr. 20, 2004, 14 pages.

\* cited by examiner

MUSIC-CONTENT USING APPARATUS CAPABLE OF MANAGING COPYING OF MUSIC CONTENT, AND PROGRAM THEREFOR

CROSS-REFERENCE TO RELATED APPLICATIONS

This application is a divisional of U.S. patent application Ser. No. 10/829,310, filed Apr. 20, 2004, which claims priority to Japanese Application No. 2003-115666, filed Apr. 21, 2003, the entire disclosures of which are herein incorporated by reference in their entirety for all purposes.

BACKGROUND OF THE INVENTION

The present invention relates to music-content using apparatus and computer programs for using music content received via wired or wireless communication networks, such as the Internet. More particularly, the present invention relates to an improved music-content using apparatus and computer program which are arranged to inhibit use of copied music content unless presence, within a predetermined area, of corresponding original music content has been confirmed.

Music-content using apparatus have been known, for example, from Japanese Patent No. 2639245, which allow any interested user to access a music content distribution server (hereinafter referred to simply as a "server") via a wired or wireless communication network, typified by the Internet, purchase desired music content from the accessed server and then use the purchased music content at any desired place at any desired time. Namely, the music-content using apparatus can acquire, from the predetermined music content distribution server accessed via the communication network, desired original music content (hereinafter also referred to as original content), such as automatic performance data (e.g., MIDI data) to be used for an automatic performance of a music piece or musical score data to be used for visually displaying a musical score, so that the user, having duly acquired (purchased) the original content, can enjoy using the acquired original content, e.g. listening to the music piece, displaying the musical score or the like.

In the conventionally-known music-content using apparatus, no user is allowed to alter as desired the acquired original content with a view to protecting a copyright of the creator of the music content; instead, an interested user is allowed to copy duly-acquired original content to generate copied content. For example, an interested user of the apparatus is allowed to copy duly-acquired original content, only within a scope of personal use not intended for re-delivery to any other person, e.g. in cases where the user wants to copy the acquired original content and then store the copied content under a user-desired name, different that should facilitate subsequent identification and sort or handling of the content, where the user wants to edit part of the acquired original content (e.g., modify a tone color and/or volume balance of automatic performance data) and then store the edited content under a user-desired name. However, in each of these cases, the user is not allowed to store the copied or edited content under the same name as the original content. Namely, with the conventional music-content using apparatus, users can not only merely use duly-acquired original content but also produce and use a copy of the acquired original content.

Further, when a copy of duly-acquired content is to be produced with the music-content using apparatus, it has been conventional for the apparatus to produce the copy with quality intentionally lowered, for example, by deleting a predetermined one or more of a plurality of performance parts, deteriorating a sound quality or otherwise, so as to prevent re-delivery, to any other person, of the music content beyond a range of personal use by the user and thereby protect a copyright of the creator of the music content etc. However, although lowering the quality of the copied music content as noted above may be suitable from the viewpoint of the copyright protection, it tends to be inconvenient where the user copies the music content only for personal use. Namely, because it has been conventional for the using apparatus to produce copied music content always with a lowered quality even when the copying is just for persona use by a duly-authorized user, there would arise the inconvenience that the copied music content can not be used satisfactorily even by the authorized user having duly acquired the music content.

SUMMARY OF THE INVENTION

In view of the foregoing, it is an object of the present invention to provide a music-content using apparatus and computer program which allow a user to use duly-acquired music content satisfactorily within a scope of personal use while still realizing effective copyright protection of the music content, by inhibiting use of a copy of the acquired music content unless presence of the original music content has been confirmed.

According to one aspect of the present invention, there is provided an improved music-content using apparatus, which comprises: an acquisition section that acquires original music content; a replicated content generation section that generates new music content on the basis of replication of the acquired original music content; and an additional information generation section that, when the replicated content generation section generates the new music content, generates additional information including information indicating that the generated new music content is based on replication and replication source information identifying a replicated-from source of the replicated content. Here, the additional information generated by the additional information generation section is added to the new music content generated by the replicated content generation section.

In the present invention, when original music content has been replicated to generate new or replicated music content, additional information, including information indicating that the new music content is based on replication and replication source information identifying a replicated-from source of the generated new content, is generated and added to the new music content. Thus, use of the replicated music content (e.g., whether the use of the replicated music content should be permitted or not) can be managed properly by ascertaining presence/absence and content of the additional information. For example, when the new (i.e., replicated) music content is to be used, a search may be made for the original music content on the basis of the replication source information included in the additional information added to the new music content, and the use of the new music content may be permitted only when the original music content has been successfully found, i.e. when the presence of the original music content has been confirmed.

Namely, in the present invention, replication of content is managed through addition of the additional information including the replication source information, unlike in the case of the conventionally-known plain copying. Thus, the present invention can prevent the use of the replicated music content without the presence of the original music content being confirmed in the music-content using apparatus in question or peripheral equipment connected thereto. As a result, the present invention can allow an authorized user to use replicated music content, generated through replication of duly-acquired original content, satisfactorily in a similar manner to the original content while still realizing effective copyright protection of the music content from infringement by unfair copying.

According to another aspect of the present invention, there is provided an improved music-content using apparatus, which comprises: an acquisition section that acquires music content including additional information added thereto, the additional information including information indicating that the music content is based on replication and replication source information identifying a replicated-from source of the music content; a search section that searches for the original music content on the basis of the source information included in the additional information added to the acquired music content; and a use section that permits use of the acquired music content only when the original music content has been successfully found by the search section. Even if the replicated music content has been re-delivered unfairly, such inventive arrangements can effectively prevent a copyright of the content infringement from being infringed due to the unfair re-delivery, because the replicated music content can not be used unless presence of the replicated-from original music content is confirmed. Namely, the inventive arrangements can reliably permit use, by a given person, of the replicated content only when the given person possesses the original music content.

The present invention may be constructed and implemented not only as the apparatus invention as discussed above but also as a method invention. Also, the present invention may be arranged and implemented as a software program for execution by a processor such as a computer or DSP, as well as a storage medium storing such a software program. Further, the processor used in the present invention may comprise a dedicated processor with dedicated logic built in hardware, not to mention a computer or other general-purpose type processor capable of running a desired software program.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

For better understanding of the object and other features of the present invention, its preferred embodiments will be described hereinbelow in greater detail with reference to the accompanying drawings, in which.

DETAILED DESCRIPTION OF THE EMBODIMENTS

In this specification, the term "replication" is used to refer to production of copied content by the music-content using apparatus of the invention, to distinguish from the term "copying" used to refer to production of copied content by ordinary computers or the like; namely, the content replication by the invention is different from the plain copying by the conventional computers or the like.

Figure 1:
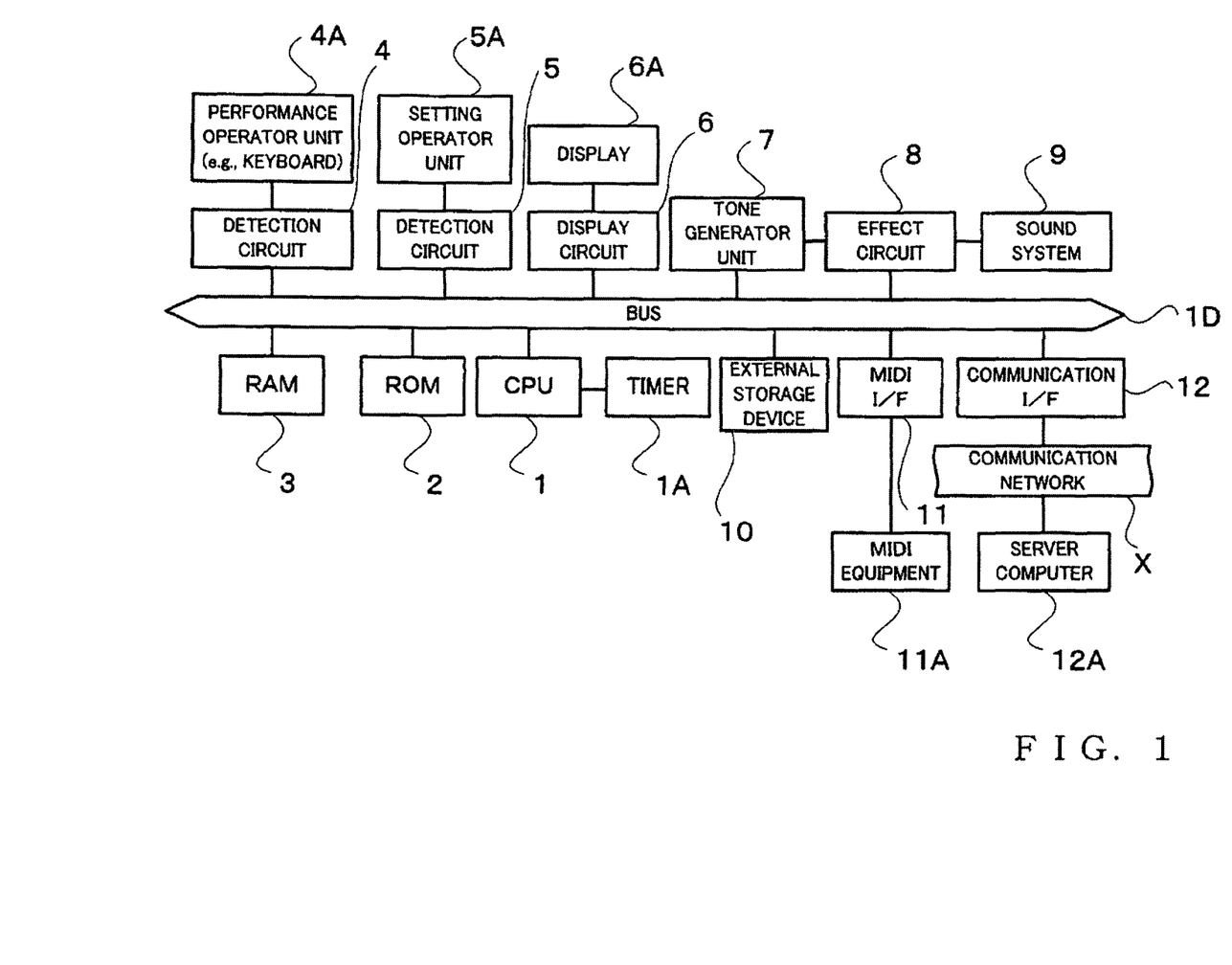
FIG. 1 is a block diagram of a general hardware setup of an electronic musical instrument to which is applied a music-content using apparatus in accordance with an embodiment of the present invention.

FIG. 1 is a block diagram of a general hardware setup of an electronic musical instrument to which is applied the music-content using apparatus in accordance with an embodiment of the present invention.

The electronic musical instrument of FIG. 1 is controlled by a microcomputer that comprises a microprocessor unit (CPU) 1, a read-only memory (ROM) 2 and a random-access memory (RAM) 3. The CPU 1 controls all operations of the electronic musical instrument. To the CPU 1 are connected, via a data and address bus 1D, the above-mentioned ROM 2 and RAM 3, detection circuits 4 and 5, a display circuit 6, a tone generator (T.G.) circuit 7, an effect circuit 8, an external storage device 10, a MIDI interface (I/F) 11 and a communication interface 12. Also connected to the CPU 1 is a timer 1A for counting various time periods, for example, to signal interrupt timing for a timer interrupt process. For example, the timer 1A generates tempo clock pulses, which are given to the CPU 1 as processing timing instructions or as interrupt instructions. The CPU 1 carries out various processes in accordance with such instructions.

The ROM 2 has prestored therein various programs to be executed by the CPU 1 and various data. The RAM 3 is provided for temporarily storing music content, such as automatic performance data or musical score data, received via a communication network X from a server computer 12A that distributes items of music content. The RAM 12 is also used as a working memory for temporarily storing various data generated as the CPU 1 executes a predetermined program, as a memory for storing the currently-executed program and data related thereto, and for various other purposes. Predetermined address regions of the RAM 3 are allocated to various functions and used as registers, flags, tables, etc. Performance operator unit 4A comprises, for example, a keyboard including a plurality of keys for selecting a pitch of each tone to be generated, which also includes a plurality of key switches provided in corresponding relation to the keys. The performance operator unit 4A can be used not only as input means for tone performances, but also as input means for entering a pitch, rhythm, etc. of an automatic performance. The detection circuit 4 produces detection outputs by detecting depression and release of the keys on the performance operator unit 4A.

Setting operator unit 5A includes switches for selecting desired music content to be acquired from the server computer 12A, switches for entering various information pertaining, for example, to an automatic performance, etc. Needless to say, the setting operator unit 5A may also include various other operators to be used for selecting, setting and controlling a tone pitch, color, effect, etc., such as a numeric keypad for entering numerical value data, a keyboard for entering character and text data, a mouse for operating a predetermined pointing element displayed on a display 6A, and/or the like. The detection circuit 5 constantly detects respective operational states of the individual operators on the setting operator unit 5A and outputs switch information, corresponding to the detected operational states of the operators, to the CPU 1 via the data and address bus 1D. The display circuit 6 visually displays, on the display 6A in the form of a liquid crystal display (LCD), cathode ray tube (CRT) and/or the like, not only various information pertaining to a multiplicity of items of music content stored in the server computer 12A accessed by the electronic musical instrument, but also various information pertaining to acquired music content and automatic performance, controlling states of the CPU 1, etc.

The tone generator (T.G.) circuit 7, which is capable of simultaneously generating tone signals in a plurality of channels, receives automatic performance data supplied thereto via the data and address bus 1D and generates tone signals on the basis of the received automatic performance data. Each of the tone signals thus generated by the tone generator circuit 7 is audibly reproduced or sounded by a sound system 9, including an amplifier, speaker, etc., after imparted with an effect by the effect circuit 8. The effect circuit 8 includes a plurality of effect units that can impart different effects to tone signals output from the tone generator circuit 7. The tone generator circuit 7, effect circuit 8 and sound system 9 may be constructed in any desired conventionally-known manner. For example, any desired tone signal synthesis method may be used in the tone generator circuit 7, such as the FM, PCM, physical model or formant synthesis method. Further, the tone generator circuit 7 may be implemented by either dedicated hardware or software processing performed by the CPU 1.

The external storage device 10, such as a hard disk, is provided for storing original music content received from the server computer 12A, content produced by replicating the received original music content, data relating to control of various programs executed by the CPU 1, etc. Details of the original music content and replicated content will be discussed later in relation to FIG. 2. In a case where a particular control program is not prestored in the ROM 2, the control program may be stored in the external storage device (e.g., hard disk device) 10, so that, by reading out the control program from the external storage device 10 into the RAM 3, the CPU 1 is allowed to operate in exactly the same way as in the case where the particular control program is stored in the ROM 2. This arrangement greatly facilitates version upgrade of the control program, addition of a new control program, etc. The external storage device 10 may use any of various removable-type media other than the hard disk (HD), such as a flexible disk (FD), compact disk (CD-ROM or CD-RAM), magneto-optical disk (MO) and digital versatile disk (DVD). Alternatively, the external storage device 10 may use a semiconductor memory.

The MIDI interface (I/F) 11 is an interface provided for receiving or delivering automatic performance data of a MIDI format (MIDI data) from or to other MIDI equipment 11A or the like externally connected with the electronic musical instrument. The other MIDI equipment 11A may be one including an operator unit of a keyboard type, stringed instrument type, wind instrument type, percussion instrument type, body-attached type or any other desired structural or operating type as long as it can generate MIDI data in response to operation by the user. Note that the MIDI interface 11 may be a general-purpose interface rather than a dedicated MIDI interface, such as RS-232C, USB (Universal Serial Bus) or IEEE1394, in which case other data than MIDI event data may be communicated at the same time. In the case where any general-purpose interface as mentioned above is used as the MIDI interface 11, the other MIDI equipment 11A may be arranged to communicate other data than MIDI event data. Of course, the automatic performance data may be of any other data format than the MIDI format, in which case the MIDI interface 11 and other MIDI equipment 11A are constructed in conformity to the data format.

The communication interface 12 is connected to a wired or wireless communication network X, such as a LAN (Local Area Network), the Internet or telephone network, via which it may be connected to a desired sever computer 12A so as to input desired music content, control program, various data etc. to the electronic musical instrument. Namely, the communication interface 12 is used not only to download user-desired music content from the sever computer 12A, but also to download a particular control program and various data from the sever computer 12A in a case where the particular control program and data are not contained in the ROM 2, external storage device (e.g., hard disk) 10 or other storage device of the electronic musical instrument. Such a communication interface 12 may be constructed to be capable of both wired and wireless communication rather than either one of the wired and wireless communication.

In the embodiment of the electronic musical instrument, the performance operator unit 4A may be of any other type than a keyboard type, such as a stringed instrument type, wind instrument type or percussion instrument type. Furthermore, the electronic musical instrument is not limited to the type where the performance operator unit 4A, display device 6A, tone generator circuit 7, etc. are incorporated together within the musical instrument; for example, the electronic musical instrument may be constructed in such a manner that the above-mentioned components are provided separately and interconnected via communication facilities such as a MIDI interface, various network and/or the like. Moreover, the music-content using apparatus of the present invention may be applied to any other apparatus than the electronic musical instrument, such as a portable communication terminal like a personal computer or portable phone, karaoke apparatus or game apparatus. In the case where the music-content using apparatus is applied to a portable communication terminal, the predetermined functions may be performed as a whole system, comprising the terminal and a server, by causing the server to perform part of the functions, rather than causing the terminal performing all of the predetermined functions.

Figure 2A:
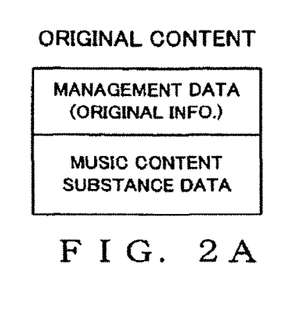
FIG. 2A is a conceptual diagram of a data format of original music content.

Next, a description will be given about data formats of music content used in the music-content using apparatus of the present invention, with primary reference to FIGS. 2A to 2C. FIG. 2A is a conceptual diagram of a data format of original music content (hereinafter also referred to simply as original content) downloaded from the server computer 12A to the electronic musical instrument, and FIGS. 2B and 2C are conceptual diagrams showing examples of data formats of replicated music content produced by replicating original content downloaded to the electronic musical instrument (or by replicating replicated content).

As seen from FIG. 2A, the original content is of the data format including at least management data and music-content substance data. The management data include information necessary to manage and identify the original content, such as information indicating that the content is original content, a file name, e.g. in the form of a music piece name, assigned to the original content, a management number uniquely identifying the original content (hereinafter "ID management number") and the like. The music-content substance data include substance data of the music content, such as MIDI data, audio data, musical score data, video data, image data and text data. The music content may comprise a plurality of types of data, in which case a plurality of types of substance data are included as the music-content substance data. When delivery, from the server to the music-content using apparatus (electronic musical instrument), of original content is requested, the original content is delivered in a form encrypted with predetermined unique information (i.e., apparatus-specific information) allocated in advance to the music-content using apparatus, as will be later described more fully in relation to FIG. 3. The music-content using apparatus decrypts the received encrypted original content in accordance with the apparatus-specific information previously allocated thereto and then stores the content in an external storage medium after re-encrypting the content on the basis of unique information (i.e., medium-specific information) allocated to the external storage medium.

Figure 2B:
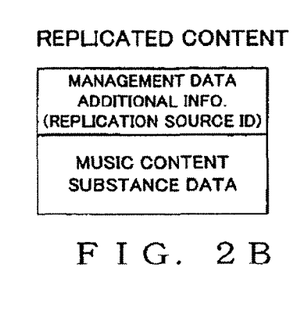
FIGS. 2B and 2C are conceptual diagrams showing examples of data formats of replicated music content.

As seen from FIG. 2B, one example of the replicated content is of a data format including at least management data and music-content substance data similarly to the original content, but these data are somewhat different from those of the original content. Namely, in the replicated content, the management data include additional information necessary to manage and identify the replicated content, such as information indicating that the content is replicated content (i.e. content based on replication), replication source information identifying a replication (replicated-from) source from which the content was replicated (e.g., an ID management number of the replicated-from source), a file name assigned to the replicated content and an ID management number uniquely identifying the replicated content. The music-content substance data, on the other hand, include substance data of the music content and may of course comprise a plurality of types of data, similarly to the original content. When replicated content is to be produced by replicating original content, encrypted original content stored in an external storage medium is decrypted in accordance with the medium-specific information of the storage medium, the thus-decrypted content is replicated to provide the desired replicated content, and the resultant replicated content is then stored in the same or other external storage medium, as will be later described in more detail in relation to FIG. 4. In the event that the replicated content has been edited after the production thereof, it is stored with a relevant portion of the music-content substance data varied accordingly.

Figure 2C:
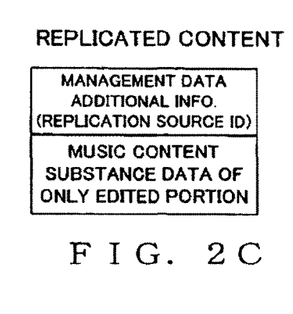

As seen from FIG. 2C, another example of the replicated content may be of a data format including at least management data and music-content substance data having only edited substance data. Namely, in the replicated content, the management data include additional information necessary to manage and identify the replicated, similarly to the replicated content of FIG. 2B. The music-content substance data, on the other hand, include only substance data edited by the user from among those of the music content, such as MIDI data, audio data, musical score data, video data, image data and text data. For example, when a tone color change (re-voice) or tone volume balance change (mixer) has been made to MIDI data, only information related to the tone color or volume balance change, such as a place of the change and contents of the changed substance data, is included or stored in the music-content substance data; no other substance data than the edited ones are included or stored. Namely, unlike the replicated content of FIG. 2B, the replicated content of FIG. 2C does not include any information related to the non-edited substance data; for the non-edited substance data, reference is made, as necessary, to the replicated-from original content (or replicated content) in accordance with the information identifying the replication source included in the management data.

Figure 3:
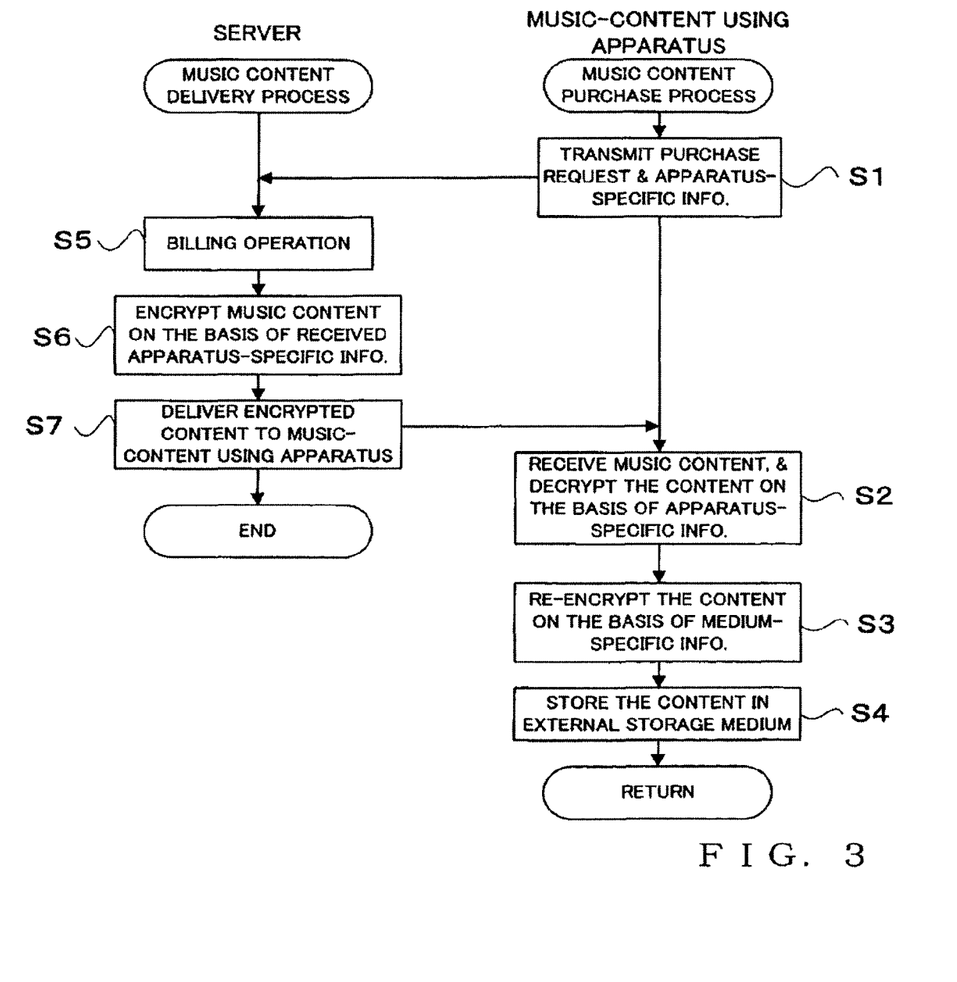
FIG. 3 is a flow chart showing an example of a music content acquisition process.

The music-content using apparatus of the present invention is intended to allow the user to replicate original music content, downloaded or acquired from the server, to thereby enjoy the acquired music content within a scope of personal use while preventing re-delivery of the music content from the user to another person (i.e., protecting the copyright of the music content). Therefore, various processes performed by the music-content using apparatus (electronic musical instrument) for accomplishing the objectives will be explained hereinbelow. First, with reference to FIG. 3, a description will be given about a "music content acquisition process" for downloading original music content from the server to the music-content using apparatus. FIG. 3 is a flow chart showing an example of the music content acquisition process. The example of the music content acquisition process is shown as carried out by the music-content using apparatus performing a music content purchase process and the sever performing a music content delivery process.

At step S1, the music-content using apparatus accesses the server storing a music site desired by the user of the using apparatus, and then transmits, to the server, a purchase request for a particular item of music content selected through user's operation, such as one for searching through the music site for the particular music content, and apparatus-specific information allocated to that using apparatus, such as a unique ID previously assigned to the using apparatus. Once the purchase request and apparatus-specific information have been received, the server identifies the particular music content on the basis of the purchase request and carries out a billing operation for charging the user a price for acquisition of the identified music content, at step S5. Then, at step S6, the identified music content is encrypted on the basis of the received apparatus-specific information. At next step S7, the encrypted music content is delivered to the music-content using apparatus. Such encrypted music content to be delivered by the server is imparted with a unique ID management number generated in any suitable manner. Because the music content is encrypted on the basis of the apparatus-specific information, any other person, who has succeeded in illegally or unfairly acquiring the music content somewhere on a delivery path, can not decrypt the unfairly-acquired music content since such an other person is unable to acquire the apparatus-specific information; therefore, any other person having unfairly acquired the music content can not use the music content.

Upon receipt of the encrypted music content from the server, the music-content using apparatus decrypts the received music content on the basis of the apparatus-specific information previously allocated thereto, at step S2. Then, at step S3, the music-content using apparatus again encrypts (re-encrypts) the decrypted music content on the basis of medium-specific information allocated to an external storage medium where the music content is to be stored, such as a medium ID assigned to a semiconductor memory. At next step S4, the re-encrypted music content is stored in the external storage medium. Namely, the original music content is stored in the external storage medium in the form re-encrypted on the basis of the medium-specific information; thus, even when the original content has been read out from the external storage medium by being copied to another storage medium via a computer or the like, the thus-copied original content can not be decrypted since the medium-specific information used to re-encrypt the original content and medium-specific information of the copied-to storage medium do not match each other. In other words, even when the original content stored in the external storage medium has been copied to an external storage medium or the like belonging to another computer, the copied original content can not be used. In this way, the instant embodiment can reliably prevent unauthorized use of music content attempted by unfair copying, through a computer or the like, of the music content. Needless to say, in the instant embodiment, arrangements are made such that any external storage medium having no medium-specific information allocated thereto can not store original content at all.

Figure 4:
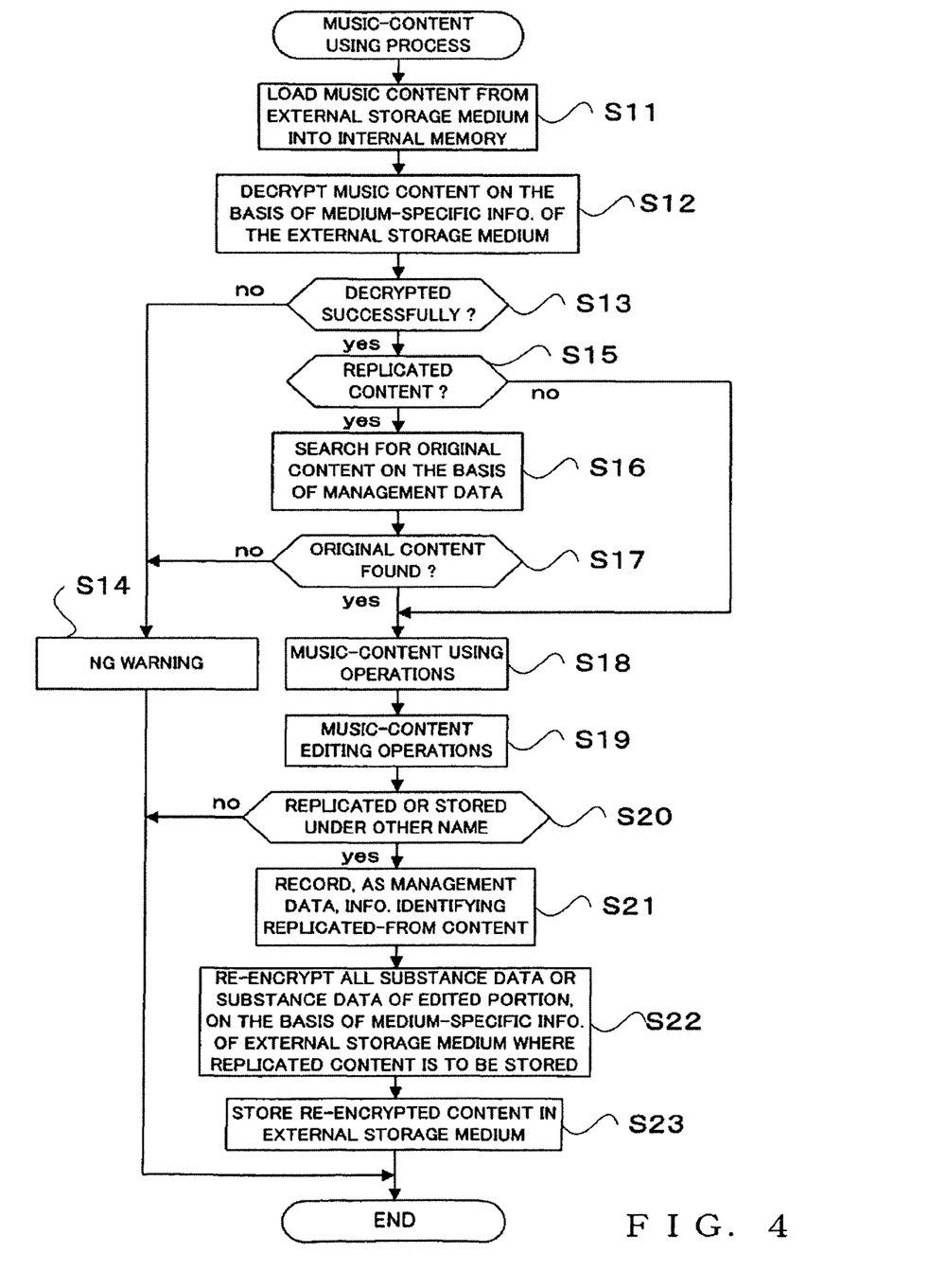
FIG. 4 is a flow chart showing an example of a music-content using process.

Next, with reference to FIG. 4, a description will be given about a "music-content using process" for using original or replicated music content stored in an external storage medium. FIG. 4 is a flow chart showing an example of the music-content using process.

At step S11 of FIG. 4, the music-content using apparatus loads desired music content, stored in an external storage medium, into its internal memory. At step S12, the music content loaded into the internal memory is decrypted on the basis of the medium-specific information of the external storage medium. Because the music content stored in the external storage medium was re-encrypted previously at the time of storage therein (see step S3 of FIG. 3), there is a need here to decrypt the content in accordance with the same medium-specific information as used at the time of the re-encryption, in order to permit use of the music content. At step S13, a determination is made as to whether or not the music content has been decrypted successfully on the basis of the medium-specific information of the external storage medium. If the decryption has failed (NO determination of step S13), an "NG (No Good)" warning is issued at step S14, after which this music-content using process is brought to an end. If the music content is stored in a proper external storage medium (i.e. external storage medium of the same medium-specific information as used at the time of the re-encryption), then the medium-specific information used at the time of the re-encryption and the medium-specific information of that external storage medium referred to in the above-mentioned decryption operation match each other, so that the music content can be decrypted successfully. If, on the other hand, the music content is stored in an improper external storage medium, other than the proper one, by being unfairly copied thereto, the medium-specific information used at the time of the re-encryption and the medium-specific information of that external storage medium do not match, so that the decryption of the music content fails. In this case, the user of the apparatus is judged as having no due authorization to use the music content in question, and an NG warning, such as one indicative of "Decryption Failed", is issued to prevent the user from attempting to use the music content.

If the music content is stored in the proper external storage medium and thus the decryption of the music content has succeeded (YES determination of step S13), it is further determined at step S15 whether the decrypted music content is replicated content, by referring to the additional information included in the management data of the music content. If it has been determined that the decrypted music content is original content, not replicated content (NO determination at step S15), the music-content using process jumps to step S18. Namely, if the successfully-decrypted music content is original content as determined at step S15, the user is allowed to use the music content with no particular condition imposed. If, on the other hand, the successfully-decrypted music content is replicated content (YES determination at step S15), a search is made through the external storage medium for the replicated-from original content in accordance with the replication source information included in the additional information of the management data, at step S16. Area or range to be searched through the external storage medium may be either all directories in the medium or only directories under which replicated content is stored. Alternatively, in a case where a plurality of external storage media are attachable to the using apparatus, all of the attached external storage media may be searched. In still another alternative, the search may also be made through any other storage device externally connected to the music-content using apparatus (personal computer), in addition to the external storage media.

Then, at step S17, a determination is made as to whether or not there has been found the replicated-from (replication-source) original content in the searched range, i.e. whether presence of the original content has been confirmed in the searched range. If the replicated-from original content has not been found in the searched range (NO determination at step S17), an NG warning, such as one indicative of "No Original Content", is issued at step S14, after which the process is brought to an end. Namely, such a situation where there exists only replicated content with no corresponding original content occurs, for example, where another external storage medium than one having the original content stored therein is attached to the music-content using apparatus and replicated content is stored in the other external storage medium. In such a case, the replicated content is judged as a result of unfair copying and the person having copied the music content is judged to have no due authorization to use the replicated music content, so that a warning is issued accordingly. If there has been found the replicated-from original content in the searched range (YES determination at step S17), then the replicated content is judged as fairly replicated content, and music-content using operations are carried out as necessary at step S18. Further, music-content editing operations are carried out as necessary at step S19. The music-content using operations include, for example, a tone generation operation, musical score display operation, etc., and the music-content editing operations include, for example, re-voice and mixer operations, arrangement and other editing of lyrics and the like.

At step S20, it is determined whether or not the music content has been replicated or stored under another name than the name of the original music content. If answered in the affirmative at step S20, information identifying the replicated-from source (i.e., replication source) is recorded as the management data, at step S21. Here, if the replication is from the original content, i.e. if the replication is "first-generation" replication, the original content is recorded as the replicated-from source. If, on the other hand, the replication is from other replicated content, i.e. if the replication is replication of second-, third- or subsequent-generation, then only the replicated-from replicated content may be recorded as the replicated-from source; alternatively, the original content may be identified by sequentially referring to the management data of every replicated-from replicated content so that the thus-identified original content is recorded as the replicated-from source. Note that, if the replication is second-, third- or subsequent-generation replication and if only the replicated-from replicated content has been recorded as the replicated-from source in the "replicated-from content search" operation (see step S16), there arises a need to identify the original content by referring to every replicated-from content in a stepwise fashion. Then, other management data are recorded. At step S22, all the substance data or only the substance data of only an edited portion are re-encrypted on the basis of the medium-specific information of the music content external storage medium where the replicated content is to be stored. At next step S23, the thus re-encrypted music content is stored into the external storage medium. In the case where only the music content substance data of the edited portion are stored as the replicated content (see FIG. 2C), and if only replication has been performed with no music content editing, no substance data is stored. Further, when the replicated content with only the music content substance data of the edited portion is to be used or edited in the above-described music-content using operations or editing operations (see steps S18 and S19), reference is made to the replicated-from music content so as to deprive all of the substance data.

With the above-described arrangements, the instant embodiment can permit both satisfactory use, by an authorized user, of music content and protection of a copyright from unfair use of the music content by any unauthorized user. The following paragraphs describe various advantages of the instant embodiment in relation to various possible cases.

(A) In the case where original content is to be used:

When desired original content is to be downloaded from the server to the music-content using apparatus, the server encrypts the original content in accordance with the apparatus-specific information of the music-content using apparatus and thereby delivers the encrypted original content to the using apparatus. Thus, even when an improper or unauthorized user has unfairly acquired the encrypted original content during the delivery, the unauthorized user can not use the unfairly-acquired encrypted original content since the content can not be decrypted. Proper or authorized user, on the other hand, can decrypt and hence use the acquired original content, and the authorized user re-encrypts the once-decrypted original content in accordance with the medium-specific information of a desired external storage medium and stores the re-encrypted original content in the external storage medium. When the authorized user wants to use the external storage medium, he or she can decrypt the original content on the basis of the medium-specific information of that external storage medium and hence use the original content.

Further, even another person, having borrowed the external storage medium from the authorized user, can use the original content read out from the borrowed external storage medium. However, where the other person wants to copy the original content from the borrowed external storage medium to his or her own external storage medium by means of a computer or the like (as noted above, the "copying" performed via the computer or the like is plain copying that is different from the "replication" performed by the music-content using apparatus of the invention), the other person can not use the copied original content since, in this case, the medium-specific information of the borrowed (i.e., copied-from) external storage medium and the medium-specific information of the copied-to external storage medium of the other person does not match.

(B) In the case where replicated content is to be used:

When an authorized user has replicated original content, read out from an external storage medium, to produce replicated content, the replicated content is encrypted on the basis of the medium-specific information of a desired external storage medium and then stored into the desired external storage medium in the encrypted form. When the authorized user uses the external storage medium, the user can use the replicated content read out from the medium since the read-out replicated content can be decrypted on the basis of the medium-specific information of the external storage medium.

Further, even another person, having borrowed the external storage medium, can use the replicated content read out from the borrowed external storage medium since the replicated content read out from the external storage medium can be decrypted on the basis of the medium-specific information of the external storage medium, in a similar manner to the original content. However, in case the original content, which is the source of the replicated content, is not stored together with the replicated content, the other person can not use the replicated content read out from the external storage medium. Further, where the other person wants to copy the replicated content from the external storage medium to his or her own external storage medium by means of a computer or the like, the other person, having no original content of the replicated content, can not use the replicated content. Furthermore, even where the other person has copied not only the replicated content but also the original content, the other person can not use the replicated content since the other person is unable to use the original content.

Where the replicated content is second- or subsequent-generation replicated content, and if the "replicated-from content search operation" (see step S16 of FIG. 4) has found that only one replicated-from content just one generation before the replicated content in question is recorded as a replicated-from source, there arises a need to ultimately identify the original content by sequentially referring to every previous replicated-from content.

When replicated content having only substance data of an edited portion (see FIG. 2C) is to be used, all of the substance data are obtained by referring to the replicated-from music content, as necessary, in the above-described "music-content using operations" and "music-content editing operations" (see steps S18 and S19 of FIG. 4).

Whereas the embodiment has been described above in relation to the case where original music content is first encrypted on the basis of the apparatus-specific information of the music-content using apparatus and then re-encrypted, after temporary decryption, on the basis of the medium-specific information of a desired external storage medium so that the original music content is stored in the desired external storage medium in the encrypted form. However, the present invention is not so limited. For example, original music content may be encrypted on the basis of only the apparatus-specific information of the music-content using apparatus or the medium-specific information of the external storage medium. Alternatively, original music content may be encrypted on the basis of any other suitable information than the above-mentioned. In any case, what is necessary is that original music content be arranged to prevent unfair use thereof by any unauthorized user.

In the present invention, the destination to which music content is to be stored (i.e., storage destination of music content" need not necessarily be an external storage medium and may be a storage device or storage medium within the music-content using apparatus; all or only some of items of content may be stored in the storage device or storage medium within the music-content using apparatus. In such a case, the above-mentioned searched range of original content (see Fig. S16 of FIG. 4) may of course be extended to the storage device or storage medium within the music-content using apparatus.

The music-content using apparatus of the present invention may be applied to any other types of equipment than the electronic musical instrument, such as an automatic music performance sequencer, effector, personal computer, game machine and multimedia equipment.

In summary, the present invention is characterized in that, when replicated music content is to be used, a search is made for corresponding original music content on the basis of information identifying a replicated-from source and use of the replicated music content is permitted only when the corresponding original music content has been successfully found within a predetermined area or range. With such arrangements, the present invention can allow the user to use the music content satisfactorily within a scope of personal use while still realizing effective copyright protection of the music content.

What is claimed is:

1. A music-content using apparatus comprising:
  a communication interface for acquiring music content including first additional information, the acquired music content based on replication from first replicated-from content, the first additional information including:
    first information indicating that the music content is based on replication and
    first replication source information identifying a first replicated-from source at which the first replicated-from content is located; and
  a processor that is configured to perform:
    first searching, through a memory system accessible by the music-content using apparatus, to find the first replicated-from content on the basis of the first replication source information included in the first additional information included by the music content acquired via said communication interface, said first searching based on the first replication source information identifying the first replicated-from source at which the first replicated-from content is located,
    wherein the first replicated-from content is original music content or not original music content,
    wherein, when the first replicated-from content is not original music content, the first replicated-from content includes second additional information, the first replicated-from content based on replication from second replicated-from content, the second additional information including:
      second information indicating that the first replicated-from content is based on replication and
      second replication source information identifying a second replicated-from source at which the second replicated-from content is located,
    wherein, when the second additional information including the second replication source information is included by the first replicated-from content that has been found by the first searching, the processor is configured to perform:
      second searching, through the memory system, to find the second replicated-from content on the basis of the second replication source information included in the second additional information included by the first replicated-from content,
      wherein the second replicated-from content is original music content or not original music content,
      wherein, when the second replicated-from content that has been found by the second searching is not original music content, the processor is configured to perform:
        sequentially repeating said second searching one or more times to sequentially find one or more previous replicated-from content based on respective replication source information included in respective additional information included by the second and previous replicated-from content;
    determining a determination indicating that the original music content has been successfully found by said first or second searching or the subsequently-repeated second searching; and
    permitting use of the acquired music content based on said determination indicating that the original music content has been successfully found by said first or second searching or the subsequently-repeated second searching.

2. A music-content using apparatus as claimed in claim 1 wherein the music content acquired via said communication interface includes a management data region and substance data region, and the first additional information is stored in the management data region.

3. A music-content using apparatus as claimed in claim 2 wherein the substance data region includes substance data of the acquired music content that comprise a replication of at least some of substance data of the original music content.

4. A music-content using apparatus as claimed in claim 2 wherein the substance data region includes substance data of the acquired music content obtained based on a change to at least some of substance data of the original music content.

5. A music-content using apparatus as claimed in claim 4 wherein said processor is configured to perform:
  acquiring the at least some of substance data of the original music content from the original music content found by said first or second searching or the subsequently-repeated performed second searching, wherein the use of the acquired music content is permitted and wherein the at least some of substance data of the original music content are not included in the substance data region of the acquired music content.

6. A music-content using apparatus as claimed in claim 1, further comprising:
  a non-transitory storage medium for storing music content;
  wherein said processor is configured to perform:
    encrypting, with medium information specific to said non-transitory storage medium, music content to be stored in said non-transitory storage medium and then storing the encrypted music content in said non-transitory storage medium.

7. A non-transitory computer-readable medium encoded with a computer program having a group of instructions for causing a computer of a music-content using apparatus to perform a music-content using method, said music-content using method comprising:
  acquiring music content including first additional information, the acquired music content based on replication from first replicated-from content, the first additional information including:
    first information indicating that the music content is based on replication and
    first replication source information identifying a first replicated-from source at which the first replicated-from content is located;
  first searching, through a memory system accessible by the music-content using apparatus, to find the first replicated-from content on the basis of the first replication source information included in the first additional information included by the music content acquired via said acquiring, said first searching based on the first replication source information identifying the first replicated-from source at which the first replicated-from content is located, wherein the first replicated-from content is original music content or not original music content;

wherein, when the first replicated-from content is not original music content, the first replicated-from content includes second additional information, the first replicated-from content based on replication from second replicated-from content, the second additional information including:

second information indicating that the first replicated-from content is based on replication from second replicated-from content and    second replication source information identifying a second replicated-from source at which the second replicated-from content is located, wherein, when the second additional information including the second replication source information is included by the first replicated-from content that has been found by the first searching, the music-content using method comprises:

second searching, through the memory system, to find the second replicated-from content on the basis of the second replication source information included in the second additional information included by the first replicated-from content,    wherein the second replicated-from content is original music content or not original music content,    wherein, when the second replicated-from content that has been found by the second searching is not original music content, the music-content using method comprises:

sequentially repeating said second searching one or more times to sequentially find one or more previous replicated-from content based on respective replication source information included in respective additional information included by the second and previous replicated-from content;

determining a determination indicating that the original music content has been successfully found by said first or second searching or the subsequently-repeated second searching; and permitting use of the acquired music content based on said determination indicating that the original music content has been successfully found by said first or second searching or the subsequently-repeated second searching.

8. A music-content using apparatus as claimed in claim 1, wherein said processor is configured to perform:

acquiring original music content;

storing the acquired original music content into the memory system;

generating new music content on the basis of replication of the acquired original music content; and in response to generation of the new music content, generating additional information including:

information indicating that the generated new music content is based on replication and    replication source information identifying a replicated-from source of the generated new music content, wherein the generated additional information is included by the generated new music content.

\* \* \* \* \*